United States Patent
Robinson

(10) Patent No.: US 7,889,264 B2
(45) Date of Patent: Feb. 15, 2011

(54) END-TO-END DESIGN OF SUPERRESOLUTION ELECTRO-OPTIC IMAGING SYSTEMS

(75) Inventor: M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1043 days.

(21) Appl. No.: 11/433,041

(22) Filed: May 12, 2006

(65) Prior Publication Data

US 2007/0268374 A1 Nov. 22, 2007

(51) Int. Cl. *H04N 5/225* (2006.01)

(52) U.S. Cl. ...................................... 348/342

(58) Field of Classification Search ............... 348/294, 348/335, 342
See application file for complete search history.

(56) References Cited

U.S. PATENT DOCUMENTS

| | | | |
|---|---|---|---|
| 5,193,124 A | 3/1993 | Subbarao | |
| 5,227,890 A | 7/1993 | Dowski, Jr. | |
| 5,521,695 A | 5/1996 | Cathey | |
| 5,550,935 A | 8/1996 | Erdem et al. | |
| 5,748,371 A | 5/1998 | Cathey | |
| 5,793,900 A | 8/1998 | Nourbakhsh et al. | |
| 5,834,761 A | 11/1998 | Okada et al. | |
| 5,870,179 A | 2/1999 | Cathey | |
| 5,932,872 A * | 8/1999 | Price | 250/201.3 |
| 6,021,005 A | 2/2000 | Cathey | |
| 6,069,738 A | 5/2000 | Cathey | |
| 6,239,909 B1 * | 5/2001 | Hayashi et al. | 359/569 |
| 6,519,359 B1 | 2/2003 | Nafis et al. | |
| 6,525,302 B2 | 2/2003 | Dowski | |
| 6,567,570 B1 | 5/2003 | Steinle et al. | |
| 6,842,297 B2 | 1/2005 | Dowski | |
| 6,873,733 B2 | 3/2005 | Dowski | |
| 6,911,638 B2 | 6/2005 | Dowski | |
| 6,940,649 B2 | 9/2005 | Dowski | |
| 7,027,221 B2 | 4/2006 | Hamborg | |
| 7,115,849 B2 * | 10/2006 | Dowski et al. | 250/201.9 |
| 7,158,182 B2 | 1/2007 | Watanabe et al. | |
| 7,400,456 B2 | 7/2008 | Smith | |
| 7,428,019 B2 * | 9/2008 | Irani et al. | 348/581 |
| 7,436,595 B2 | 10/2008 | Cathey, Jr. et al. | |

(Continued)

FOREIGN PATENT DOCUMENTS

EP 0769879 A1 4/1997

(Continued)

OTHER PUBLICATIONS

Cathey, W. Thomas et al., "New Paradigm for Imaging Systems," Applied Optics, Oct. 10, 2002, pp. 6080-6092, vol. 41.

(Continued)

*Primary Examiner*—Jason Whipkey
*Assistant Examiner*—Amy Hsu
(74) *Attorney, Agent, or Firm*—Fenwick & West LLP

(57) ABSTRACT

A superresolution electro-optic imaging system operates in a manner that takes into account the different subsystems. For example, rather than designing the optical subsystem to be diffraction-limited, the optical subsystem can be designed in a manner that is better suited for subsequent superresolution processing and/or that reduces aliasing effects.

28 Claims, 11 Drawing Sheets

U.S. PATENT DOCUMENTS

| | | | |
|---|---|---|---|
| 7,616,841 | B2 | 11/2009 | Robinson et al. |
| 2002/0118457 | A1 | 8/2002 | Dowski |
| 2002/0195548 | A1 | 12/2002 | Dowski |
| 2003/0016301 | A1 | 1/2003 | Aizaki et al. |
| 2003/0057353 | A1 | 3/2003 | Dowski |
| 2003/0169944 | A1 | 9/2003 | Dowski |
| 2003/0173502 | A1* | 9/2003 | Dowski et al. ............... 250/216 |
| 2004/0145808 | A1 | 7/2004 | Cathey |
| 2004/0190762 | A1 | 9/2004 | Dowski |
| 2004/0228005 | A1 | 11/2004 | Dowski |
| 2004/0257543 | A1 | 12/2004 | Dowski |
| 2005/0057687 | A1* | 3/2005 | Irani et al. .................. 348/443 |
| 2005/0088745 | A1 | 4/2005 | Cathey |
| 2005/0117114 | A1 | 6/2005 | Jiang |
| 2005/0197809 | A1 | 9/2005 | Dowski |
| 2005/0264886 | A1 | 12/2005 | Dowski |
| 2006/0038891 | A1* | 2/2006 | Okutomi et al. .......... 348/222.1 |
| 2006/0061878 | A1 | 3/2006 | Smith |
| 2006/0072106 | A1* | 4/2006 | Matsui et al. ............ 356/237.5 |
| 2006/0110147 | A1 | 5/2006 | Tomita et al. |
| 2006/0139476 | A1 | 6/2006 | Sasaki |
| 2007/0081224 | A1 | 4/2007 | Robinson et al. |
| 2007/0177027 | A1* | 8/2007 | Nakamura et al. ....... 348/222.1 |
| 2007/0247733 | A1 | 10/2007 | Shiozawa et al. |
| 2007/0268375 | A1* | 11/2007 | Robinson et al. ......... 348/222.1 |

FOREIGN PATENT DOCUMENTS

| | | |
|---|---|---|
| EP | 0814605 A2 | 12/1997 |
| EP | 0998124 A2 | 5/2000 |
| WO | WO 2004/063989 A2 | 7/2004 |

OTHER PUBLICATIONS

Farrell, Joyce E. et al., "A Simulation Tool for Evaluating Digital Camera Image Quality," Image Quality and System Performance, Ed. Yoichi Miyake et al., Proceedings of SPIE-IS&T Electronic Imaging Conference, 2004, pp. 124-131, vol. 5294.

Kolb, Craig et al., "A Realistic Camera Model for Computer Graphics," Computer Graphics, Proceedings of SIGGRAPH 1995, pp. 317-324.

Maeda, Patrick Y. et al., "Integrating Lens Design with Digital Camera Simulation," 5678 SPIE Proceedings SPIE Electronic Imaging, Feb. 2005, pp. 48-58, San Jose, CA.

Fales, C.L. et al., "Imaging System Design for Improved Information Capacity," Applied Optics, Mar. 15, 1984, pp. 872-888, vol. 23, No. 6.

Partial European Search Report, European Application No. 07251951.5, May 11, 2010, 5 pages.

European Extended Search Report, European Application No. 07251951.5, Sep. 21, 2010, 10 pages.

* cited by examiner

Secondary photodiode (Lower sensitivity)

Primary photodiode (Higher sensitivity)

END-TO-END DESIGN OF SUPERRESOLUTION ELECTRO-OPTIC IMAGING SYSTEMS

BACKGROUND OF THE INVENTION

1. Field of the Invention

This invention relates generally to superresolution electro-optic imaging systems, including the "end-to-end" design of such systems.

2. Description of the Related Art

Electro-optic imaging systems typically include an optical subsystem (e.g., a lens assembly), an electronic detector subsystem (e.g., CCD detector array) and a digital image processing subsystem (e.g., typically implemented in dedicated chips or software). In most electro-optical imaging systems, the spatial sampling rate of the photodetector is well below the diffraction limit of the optical subsystem. In current technology, the smallest pixel dimensions (i.e., pixel-to-pixel pitch) are typically on the order of 3 to 4 microns. The corresponding Nyquist rate associated with such pixel dimensions are between 125 and 166 line pairs per millimeter (lp/mm). It is not uncommon to have optical subsystems with an F# as low as 3 or 4. Given that the diffraction limit is given by $1/(\lambda F\#)$, diffraction limited optical subsystems can pass image content with spatial frequencies as high as 500 lp/mm in the visible spectrum.

FIG. 1 shows an example of a modulation transfer function (MTF) 110 for an F/4.5 diffraction-limited optical subsystem, the MTF 120 for a 100 percent fill factor 15 micron pitch pixel, and the cumulative MTF 130 for the optical subsystem and detector together. For convenience, the MTF for the optical subsystem will be referred to as the optical MTF 110, the MTF for the detector subsystem as the detector MTF 120, and the combined MTF as the imaging MTF 130. The imaging MTF is the product of the optical MTF and the imaging MTF. Also shown is the Nyquist rate for the detector subsystem which is 33 lp/mm in this example. The Nyquist sample rate will also be referred to as the detector sampling frequency. The box 140 indicates the MTF region up to the Nyquist rate. There is a significant fraction of the imaging MTF 130 that lies outside the sampling band 140 (i.e., at frequencies higher than the sampling frequency). Consequently, this electro-optical imaging system has the potential to pass image content with spatial frequencies above the Nyquist rate.

In theory, the image content at higher frequencies could be captured by reducing the pitch of the detector array, thus increasing the detector sampling frequency. However, the ability to shrink pixel dimensions is limited. As pixel dimensions shrink, the dynamic range and signal to noise ratio (SNR) of pixels degrade.

Returning to FIG. 1, when spatial frequency information above the Nyquist rate is sampled, the final image may contain aliasing artifacts such as moirépatterns. The effect of aliasing is even more pronounced in color systems using a single photodetector. In such cases, the Bayer pattern reduces the Nyquist rate by a factor of two further exacerbating the problem of aliasing. Researchers have developed a variety of techniques to eliminate aliasing artifacts. To some degree or another, these approaches typically involve some form of an optical low pass filter that effectively destroys the information content above the Nyquist rate. For instance, Kodak sells an optically transparent plate that is placed directly in front of the detector. The plate has randomly placed particles which introduce random phase errors. This effectively blurs the optical image, thus reducing the content at frequencies above the Nyquist rate and reducing the effects of aliasing.

In another approach, the image content is replicated in a color-dependent fashion using the spatial shifting property of a birefringent plate. The birefringent plate replicates the point spread function of the optical subsystem but shifted with respect to the original point spread function. The cumulative point spread function created by the original and its shifted versions can span one or two pixel widths. This replication effectively blurs the optical image to reduce frequency information above the Nyquist rate. However, such optical low pass filters often are wavelength dependent.

In yet another approach, CDM Optics of Boulder, Colo. developed a specially designed phase plate that is placed at the aperture of the optical subsystem in order to encode the incoming wavefront in a particular way. Digital image processing is used later to reverse the encoding introduced by the phase plate and retrieve certain image content. However, the CDM approach appears to work for only certain types of artifacts and it can produce overly smooth images.

Superresolution is a different approach that tries to make use of the aliased information rather than suppress it. Superresolution takes a collection of lower resolution images that contain aliased image content and produces a single image or set of images with higher resolution. For example, in a conventional superresolution system, the optical subsystem might produce a diffraction-limited image that is captured by the detector subsystem. A number of shifted versions of the image may be captured and then combined to form a higher resolution image. However, even though the superresolution processing effectively increases the sampling frequency, many high quality optical subsystems have imaging MTFs that still contains significant energy in frequencies above the effective superresolved sampling frequency. This can continue to cause aliasing artifacts.

Thus, there is a need for approaches that can take advantage of image content that is above the detector sampling frequency and/or that reduces aliasing effects, but in a manner that overcomes some or all of the above drawbacks.

SUMMARY OF THE INVENTION

The present invention overcomes the limitations of the prior art by providing a superresolution electro-optic imaging system where the overall system takes into account the different subsystems. For example, rather than designing the optical subsystem to be diffraction-limited, the optical subsystem can be designed in a manner that is better suited for subsequent superresolution processing and/or that reduces aliasing effects for the superresolution system.

In one aspect of the invention, a superresolution electro-optic imaging system includes an optical subsystem, a detector subsystem and a superresolution digital image processing subsystem. The detector subsystem captures two or more lower resolution images of a source, which are combined by the digital image processing subsystem using superresolution processing into a higher resolution image of the source. The detector subsystem is characterized by a detector sampling frequency and the superresolution processing determines an overall effective system sampling frequency (the superresolved sampling frequency) that is higher than the detector sampling frequency. It typically is an integer multiple of the detector sampling frequency. The optical subsystem is designed for superresolution processing in that the actual optical MTF of the optical subsystem contains a higher fraction of energy in the superresolved sampling band (i.e., the frequencies below the superresolved sampling frequency), than would normally be contained in the optical MTF for either a diffraction-limited optical subsystem or an optical subsystem which is low pass filtered to matched to the detector Nyquist rate (i.e., a low pass filtered single-frame optical subsystem). In this way, image content is concentrated in the superresolved sampling band, which are the frequencies that are useable by superresolution processing. Image content at higher frequencies is reduced, thus reducing aliasing effects.

In one design, the optical MTF behaves substantially as a low pass filter with a cutoff frequency at the superresolved sampling frequency. In another implementation, the optical subsystem and detector subsystem together are characterized by an imaging MTF that has no zeroes below the superresolved sampling frequency. Note that the superresolution system can make use of image content at frequencies that are above the detector sampling frequency but below the superresolved sampling frequency. This band of frequencies will be referred to as the superresolution band. In single-frame systems, the superresolution band is above the Nyquist rate and can cause aliasing effects. Therefore, in one approach, the optical MTF contains a higher fraction of energy in the superresolution band, compared to either the equivalent diffraction-limited optical MTF (which contains more energy at higher frequencies) or the equivalent low pass filtered single-frame MTF (which is low pass filtered to reduce energy in the superresolution band).

In another aspect of the invention, the imaging subsystem (i.e., optical subsystem and detector subsystem together) is characterized by an imaging MTF that can be adjusted to produce lower resolution images using different imaging MTFs. These lower resolution images are then combined using superresolution processing. For example, the detector subsystem might include detectors with an adjustable geometry, and adjusting the detector geometry adjusts the imaging MTF. Examples of adjustable geometry include variable fill factor detectors and variable shape detectors. As another example, the optical subsystem might have moveable optical components, and moving the optical components adjusts the imaging MTF. In one design, the imaging MTF is characterized by an imaging cutoff frequency, and different imaging MTFs have different imaging cutoff frequencies. In this way, content at different frequencies can be captured. For example, lower resolution images captured using different imaging MTFs may be combined to produce a higher resolution image which effectively has no zeros in its effective imaging MTF.

In another aspect of the invention, the electro-optic imaging system is multi-mode. It can be used in either a single-frame (i.e., non-superresolution) mode or in a superresolution mode. In one approach, the optical subsystem has one or more moveable optical components, and the optical subsystem is switched between single-frame mode and superresolution mode by moving the optical component(s). In many cases, the subsystems will be designed so that the imaging MTF cutoff frequency in the superresolution mode is higher than that for the single-frame mode.

Other aspects of the invention include methods for designing the devices and systems described above, and applications of all of the above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
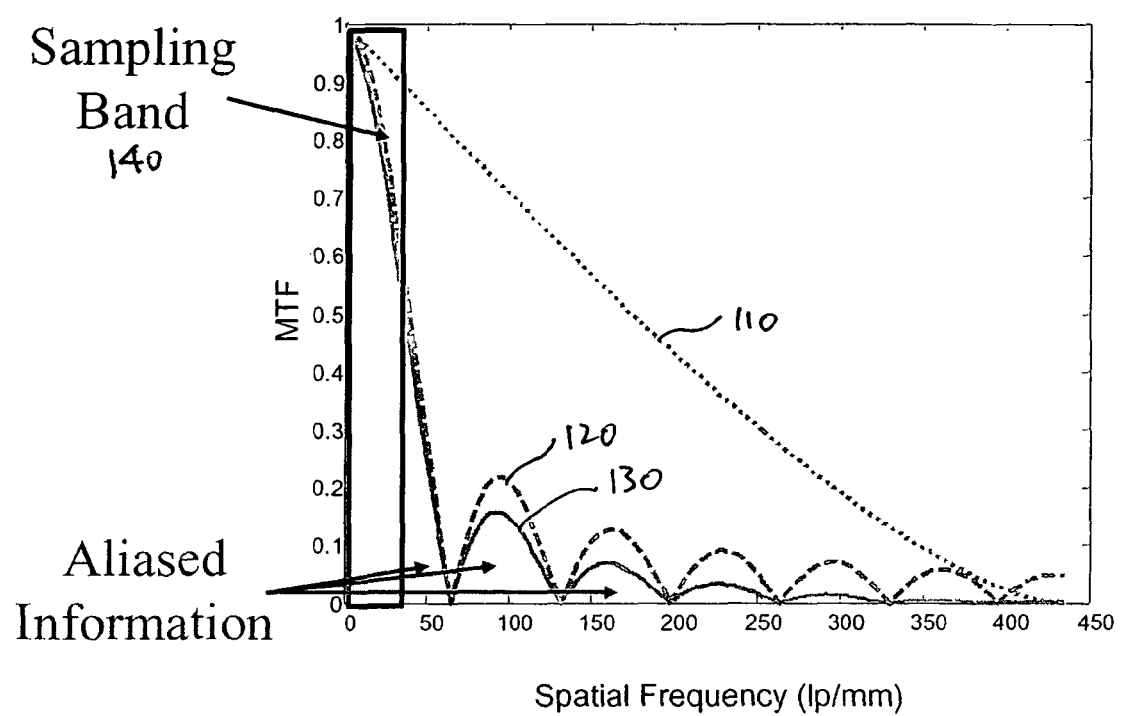
FIG. 1 (prior art) is a graph showing modulation transfer functions (MTFs) of an electro-optic imaging system.
Figure 2:
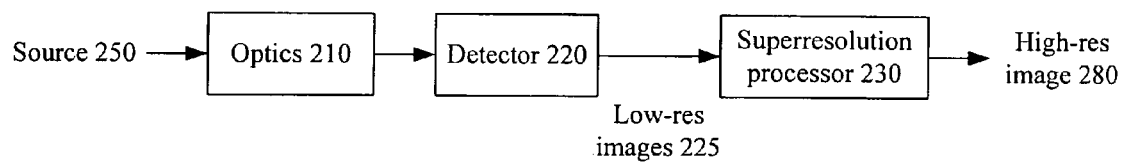
FIG. 2 is a block diagram of an electro-optic imaging system according to the invention.

FIG. 2 is a block diagram of an electro-optic imaging system 200 according to the invention. The overall system 200 includes an optical subsystem 210, detector subsystem 220 and superresolution digital image processing subsystem 230. The image processing portion 230 has superresolution capability. The optical subsystem 210 and detector subsystem 220 produce lower resolution images 225 of a source 250, which are combined by the superresolution subsystem 230 to yield a higher resolution image 280 of the source.

In more detail, superresolution is the process of taking a collection of lower resolution images 225 that contain aliased image content and combining them into a higher resolution image 280, typically by taking advantage of the aliased image content in the lower resolution images. In one approach, a linear mathematical model used to describe the imaging process is given by $$y_i = DAF_i s + e \qquad (1)$$

Figure 3A:
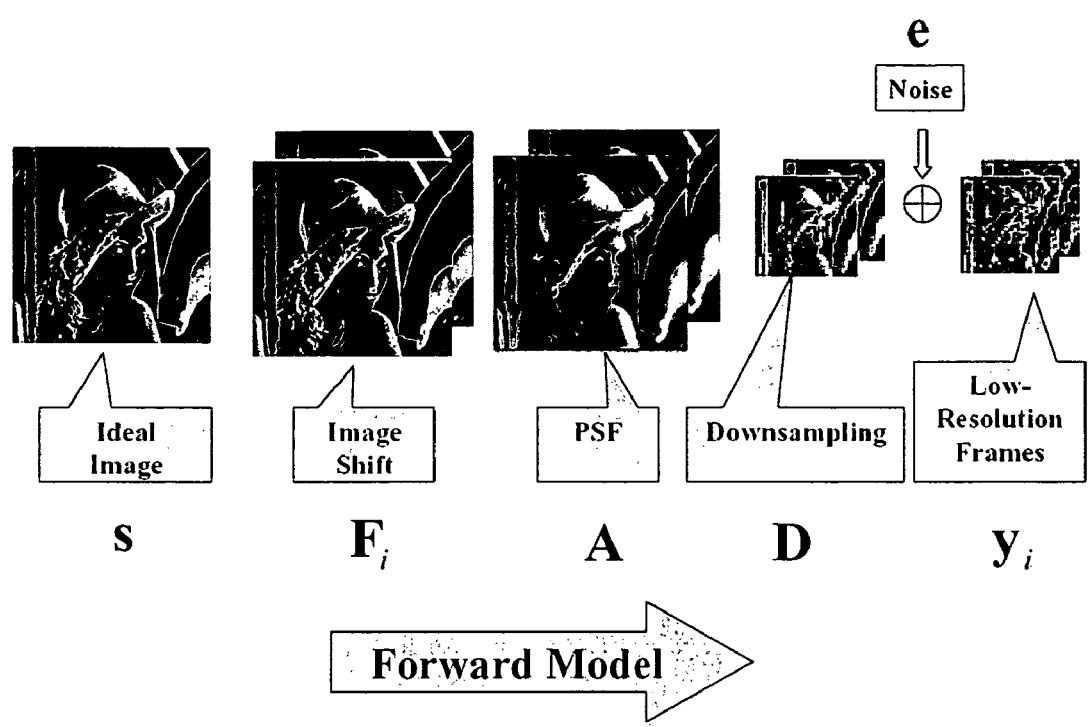
FIG. 3A illustrates a forward model of superresolution imaging.

FIG. 3A shows a pictorial representation of this forward imaging model.

In this model, a number of lower resolution images $y_i$ of a source 250 are captured by the imaging subsystem (i.e., the optical subsystem 210 and detector subsystem 220). The process is modeled as follows. The ideal image s is a digital image of the source 250 that is sampled to match the diffraction limit of the optical subsystem 210. A set of images are generated which contain shifts or offsets with respect to the input frame according to the shift model $F_i$. $F_i$ accounts for the shift in the ith observed image with respect to a reference frame. These images are blurred by the optical subsystem and the detector subsystem point spread functions (equivalently, MTFs) according to the blurring term A. The matrix D represents the sample rate conversion between the diffraction-limited sample rate and the actual sample rate of the detector. The vector e represents the noise in the imaging subsystem. For further details about linear models of the imaging process, see for example paragraphs 39-43 of U.S. patent application Ser. No. 11/332,640, "End-to-end design of electro-optic imaging systems with constrained digital filters," filed Jan. 13, 2006 and paragraphs 32-47 of U.S. patent application Ser. No. 11/155,870, "End-to-end design of electro-optic imaging systems," filed Jun. 17, 2005. The teachings of both of which are incorporated herein by reference.

The shifts $F_i$ can be achieved using different mechanisms. For example, an actuator can be used to physically shift components in the system. In one approach, the optical subsystem is held in a fixed position and the detector is moved. Alternately, the detector can be held in a fixed position and the optics moved. As another example, the imaging optics and the detector can be held in fixed positions relative to each other, with the shift produced by an optical effect, such as tilting a flat glass plate, rather than by physically moving the imaging optics or detector relative to each other.

The superresolution digital image processing subsystem 230 reconstructs the higher resolution image using additional phase information provided by the set of shifts or offsets $F_i$ among a set of lower resolution images $y_i$. Typically, the resolution is increased by a certain multiple of the lower resolution (detector) sampling rate. For instance, the resolution might be improved by an integer factor m, usually between two to five. Effectively, the superresolution algorithm synthesizes the image that would have been captured by a sensor with m times the pixel density. In other words, the effective sampling rate (i.e., the superresolved sampling frequency) is m times the actual sampling rate of the detector (i.e., the detector sampling frequency).

Figure 3B:
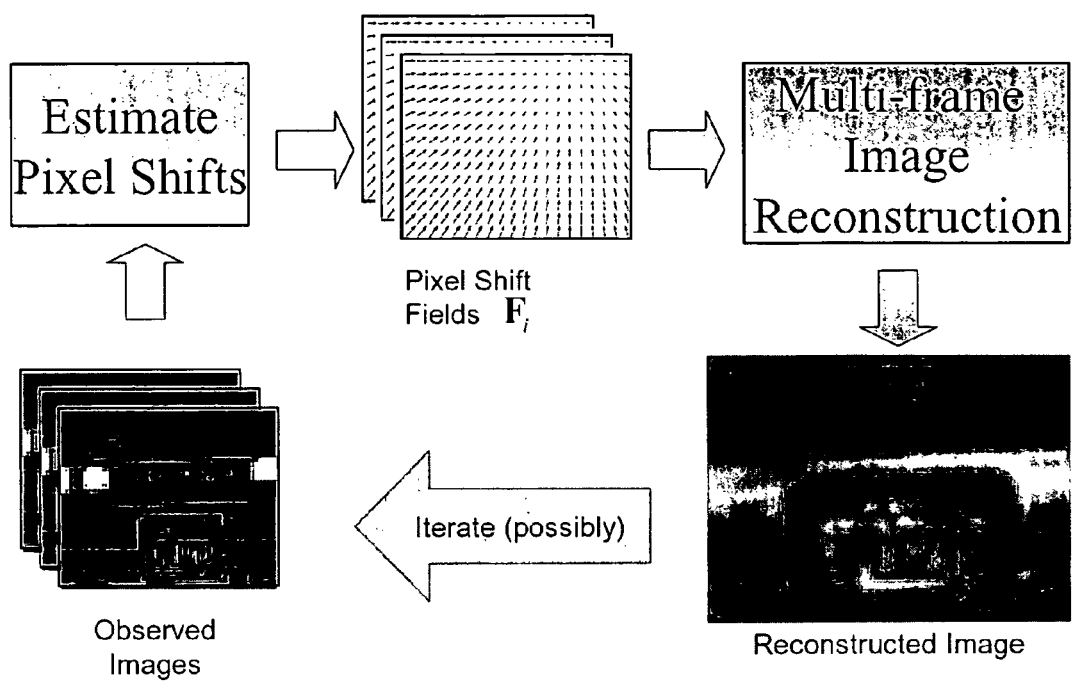
FIG. 3B illustrates operation of a superresolution digital image processing subsystem.

FIG. 3B shows a block diagram indicating the steps associated with a typical superresolution digital image processing subsystem 230. First, the pixel shifts or offsets for the lower resolution images are estimated (or are known a priori) to relate the set of captured images to an absolute coordinate system. Then, based on the shifts, the lower resolution images are combined into the higher resolution image and subsequently sharpened to remove the effects of optical and detector blurring. Some algorithms iterate these steps to improve performance.

Superresolution processing extracts information that is located at frequencies above the detector sampling frequency but below the superresolved sampling frequency. This information causes aliasing in the lower resolution images but yields the higher resolution of the reconstructed higher resolution image. For convenience, this band of frequencies will be referred to as the superresolution band.

Figure 4:
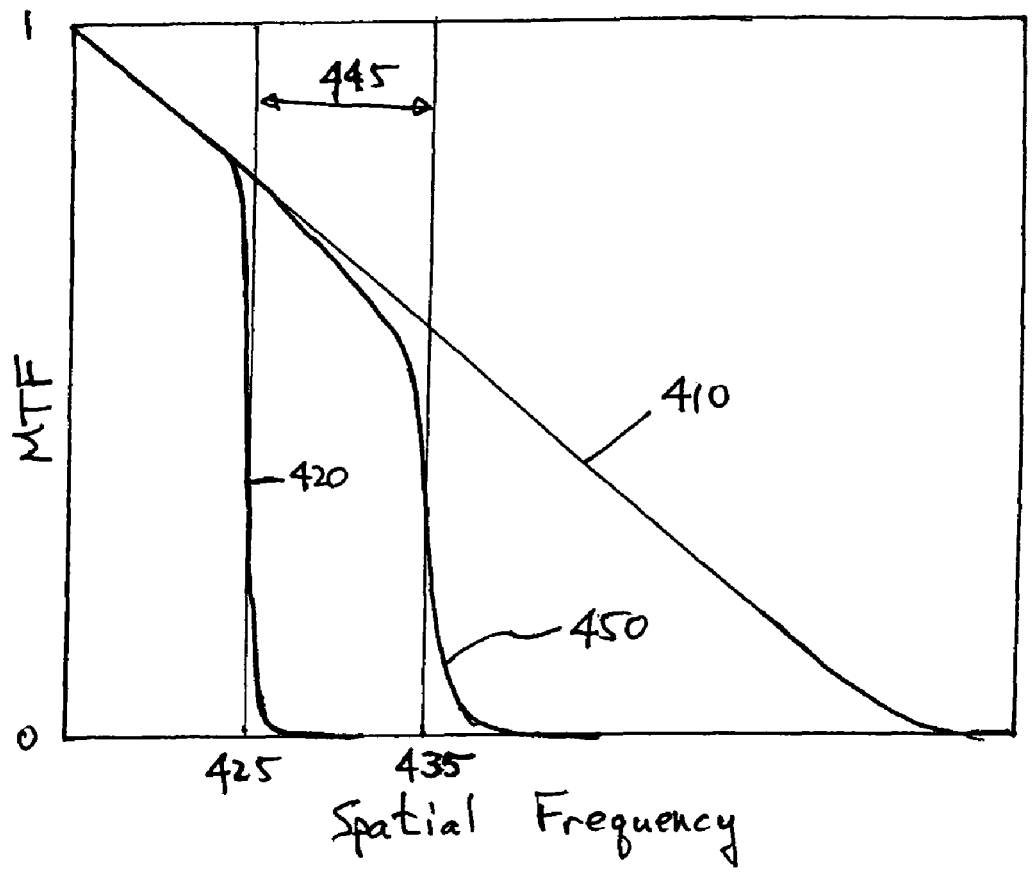
FIG. 4 is a graph illustrating various frequency pass bands.

FIG. 4 is a frequency diagram that illustrates these concepts. In FIG. 4, curve 410 is the MTF of an equivalent diffraction-limited optical subsystem. The actual optical subsystem may not be diffraction-limited. MTF 410 is for an optical subsystem with the same F/# and aperture, but that is diffraction-limited in performance. Frequency 425 is the detector sampling frequency, which is determined by the detector pitch. In conventional systems without superresolution capability, the detector sampling frequency 425 typically would determine the cutoff frequency for the overall system, and information at higher frequencies would cause aliasing.

However, in superresolution, the superresolved sampling frequency 435 can be significantly higher than the detector sampling frequency 425 and typically is an integer multiple of the detector sampling frequency 425. The superresolution band 445 is the band of frequencies located between the detector sampling frequency 425 and the superresolved sampling frequency 435. The superresolution band 445 would cause aliasing in a non-superresolution system but represents useful information in the pass band for a superresolution system.

Curve 450 shows a near-ideal optical MTF (i.e., MTF for only the optical subsystem) for superresolution processing. This MTF maximizes energy below the superresolved sampling frequency 435 (including in the superresolution band 445) and minimizes energy above the superresolved sampling frequency 435. Put in another way, compared to the equivalent diffraction-limited MTF 410, this optical MTF 450 increases the fraction of energy that is contained in frequencies below the superresolved sampling frequency 435. It also increases the fraction of energy contained in the superresolution band 445.

Curve 420 shows a near-ideal optical MTF for the equivalent low pass filtered single-frame system. In this system, there is no superresolution processing but the optical subsystem includes low pass filtering (such as Kodak's random phase plate) that reduces image content at frequencies above the detector sampling frequency 425. Compared to the low pass filtered single-frame MTF, MTF 450 increases the image content in the superresolution band 445. Put in another way, in MTF 450, a higher fraction of energy is contained in the superresolution band 445.

The overall imaging MTF (i.e., optical MTF multiplied by detector MTF) is determined in part by the detector MTF. For detectors with a fixed pitch and fixed geometry, the detector MTF typically will fall to zero at a frequency that is above the Nyquist rate for the detector but may be below the superresolved Nyquist rate. This is generally undesirable because a zero within the superresolved sampling band means information that would have been useful to the superresolution system will not be available. Therefore, the imaging MTF preferably has no zeroes below the superresolved sampling frequency 435. Since it is usually easier to design optical MTFs without zeros in this sampling band, whether the imaging MTF has zeros in this sampling band typically is driven by whether the detector subsystem has zeros below the superresolved sampling frequency 435. Examples of systems that effectively avoid these zeroes will be given below.

Note that traditional methods for designing electro-optic imaging systems generally involve discrete stages. First, the optical subsystem is designed with the goal of forming a high quality intermediate optical image of the source (e.g., designing a diffraction-limited optical subsystem). Then, after the basic optical design is completed and a high quality image can be achieved, an optical low pass filter may or may not be added to intentionally corrupt the content at frequencies above the detector sampling frequency (i.e., to corrupt the high quality image). Finally, after the (diffraction-limited) optical subsystem has been designed, the superresolution processing is designed to apply superresolution to the lower resolution images captured by the diffraction-limited optical subsystem. However, as shown in FIG. 4, neither a diffraction-limited MTF nor a low pass filtered single-frame MTF is necessarily optimal for superresolution processing.

Therefore, there can be synergy when designing the optical subsystem, detector subsystem and superresolution digital image processing subsystem together. For example, the detector subsystem might be specified a priori and the optical subsystem then designed in a manner that accounts for the given detector subsystem and the fact that superresolution processing will be applied to the captured images.

Figure 5A:
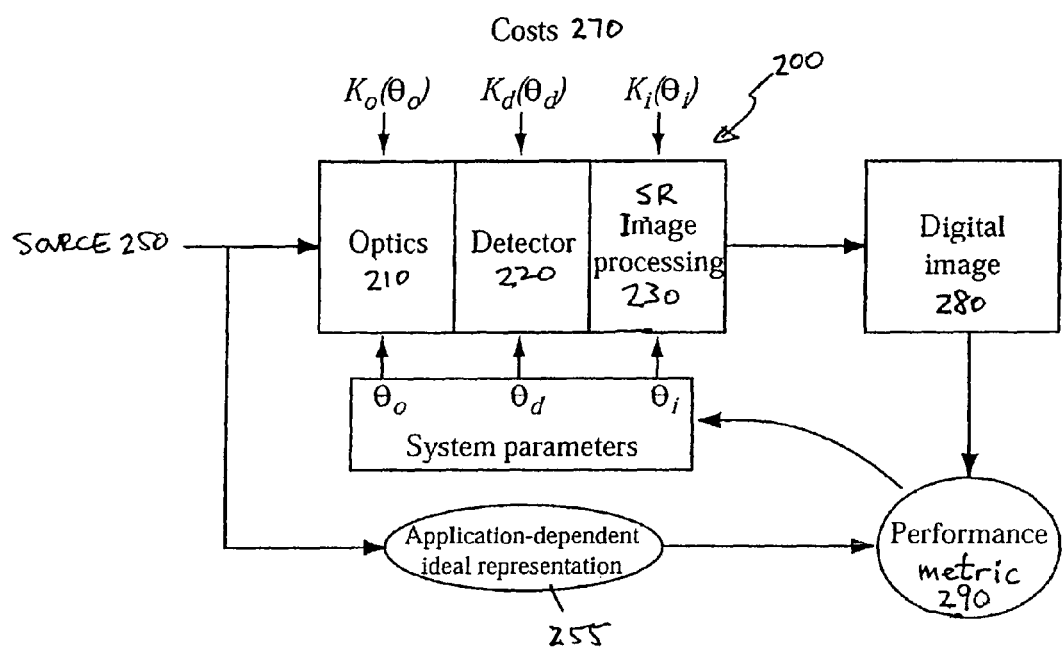
FIG. 5A is a block diagram illustrating the "end-to-end" design of a superresolution electro-optic imaging system.

FIG. 5A is a block diagram illustrating the "end-to-end" design for such a superresolution electro-optic imaging system. The general design problem is to design the superresolution imaging system 200 to "optimize" its overall performance, subject to certain constraints. In many cases, the goal of optimization is to produce a high resolution image 280 which matches the application-specific idealized version 255 of the input source.

Figure 5B:
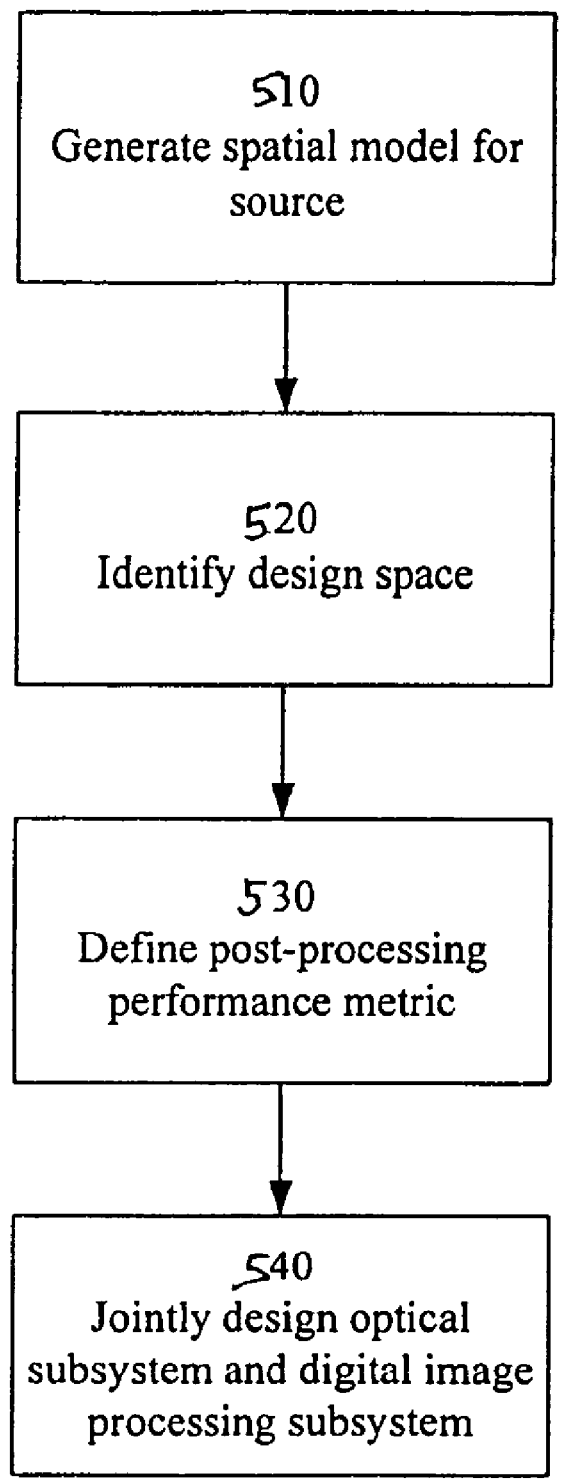
FIG. 5B is a flow diagram illustrating a method of "end-to-end" design of a superresolution electro-optic imaging system.

FIGS. 5A and 5B illustrate an example method for designing an electro-optic imaging system 100 according to the present invention. Referring to FIG. 5B, the design method includes generating 510 a spatial model of the source 250. The spatial model of the source may be derived for a specific situation, empirically measured, based on previously developed models or otherwise provided. Illumination, radiometry and geometry are factors that may be reflected in the source model. The spatial model preferably includes a statistical model of the source.

The design space for the electro-optic imaging system is also defined 520. In FIG. 5A, each of the subsystems is defined by its parameters $\theta_o$, $\theta_d$ and $\theta_i$, respectively. For example, the design space for the optical subsystem 210, described by the vector $\theta_o$, may be defined by number, type and size of lenses, radii of curvature, stops, etc. The design space for the detector subsystem 220, described by the vector $\theta_d$, may parameterize the number of pixels, detector pitch, fill factor, bandwidth, pixel geometry, etc. In this particular example, the design space for the superresolution digital image processing subsystem 230, described by the vector $\theta_i$, may include the number of low resolution images to combine, the relative weightings of the low resolution images, the sharpening filter coefficients, etc. Various non-imaging constraints or costs 270 associated with the designs may also be defined. The size of the design space of each subsystem will vary depending on the application. In some cases, there may be much latitude in designing a subsystem. In other cases, the design of the subsystem may be tightly constrained or even pre-defined (e.g., if the detector array is selected a priori).

A post-processing performance metric 290 is also defined 530. The performance metric is post-processing in the sense that it is based on performance after superresolution processing rather than before superresolution processing. For examples, measures of the wavefront error or spot size of the intermediate optical image produced by the optical subsystem alone may be conventional error metrics for the optical subsystem but they are not post-processing performance metrics. In FIG. 5A, the post-processing performance metric 290 is based on a comparison of the high resolution digital image 280 produced by the superresolution processor 230 compared to the ideal digital image 255. In many design situations, the image 280 produced by the system is calculated by modeling propagation of the source characteristics 250 through the subsystems 210, 220 and 230 based on the spatial model of the source.

The design step 540 can be described as selecting a design within the design space that optimizes the post-processing performance metric 290, possibly subject to certain constraints (e.g., limits on the digital filter design). The optical subsystem 210 and the superresolution processor 230 are designed together, rather than sequentially as is the case in conventional design approaches. Mathematically, using the notation of FIG. 5A, the design step can be described as selecting the system parameters $\theta_o$, $\theta_d$ and $\theta_i$ to directly optimize the performance metric, possibly subject to certain constraints on the costs 270. For example, an image-based post-processing performance metric 290 may be optimized subject to a maximum financial cost. Alternately, the financial cost may be minimized subject to some minimum acceptable post-processing performance metric 290 for the digital image 280.

A number of optimization algorithms can be used. For some linear cases, parameters may be solved for analytically or using known and well-behaved numerical methods. For more complicated cases, including certain nonlinear cases, techniques such as expectation maximization, gradient descent and linear programming can be used to search the design space.

Note that in both FIGS. 5A and 5B, there is no requirement for the optical subsystem 210, the detector subsystem 220 or the superresolution processor 230, taken alone, to be optimal. It is quite possible for these subsystems to exhibit less than optimal performance when considered alone, while the overall superresolution electro-optic imaging system 200 still exhibits good or even optimal performance. This is in direct contrast to conventional design methods where, for example, the optical subsystem 210 typically is designed by directly optimizing the image quality of the intermediate optical image formed by it. For example, the optical subsystem 210 may be designed based directly on minimizing the RMS wavefront error or the RMS spot size. In contrast, for the design approach of FIGS. 5A-5B, the intermediate optical image formed by the optical subsystem 210 may have worse image quality (e.g., as measured by wavefront error or spot size), for example in order to reduce image content at frequencies above the superresolved sampling frequency. The optical subsystem 210 is not designed based directly on improving the image quality of the intermediate optical image. Rather, it is designed jointly with the superresolution digital image processing subsystem 230, based directly on optimizing the post-processing performance metric 290.

For additional descriptions and example of end-to-end design, see for example U.S. patent application Ser. No. 11/332,640, "End-to-end design of electro-optic imaging systems with constrained digital filters," filed Jan. 13, 2006 and U.S. patent application Ser. No. 11/155,870, "End-to-end design of electro-optic imaging systems," filed Jun. 17, 2005. The teachings of both of which are incorporated herein by reference.

The following are some examples concerning design of the optical subsystem and detector subsystem. The blurring operator A of Eqn. 1 can be expanded into two components, $A_o$ and $A_d$, for the optical and detector subsystems respectively. Let $\Phi$ represent design parameters that may be adjusted during the design process (or even afterwards during operation). The problem then is to select the $\Phi$ that maximizes end-to-end performance, including the superresolution processing.

As a first example, consider the design of the optical subsystem. The blurring matrix $A_o(\Phi)$ depends on the design parameters $\Phi$ that relate to the optical subsystem (e.g., surface curvatures, spacings, etc). In the following example, these design parameters are optimized to maximize image quality after superresolution processing.

Begin by analyzing the image information throughput of the system by studying Eqn. 1. Assume that the relative shifts $F_i$ are controllable. Based on this, superresolution processing can extend the superresolved sampling rate to m times the detector sampling rate. Hence, one goal of electro-optical image system design can be to select the design parameters $\Phi$ so as to maximize the average imaging MTF at frequencies up to m times the detector Nyquist rate, where the average is taken over the set of images $y_i$. Note that if statistics or other information about the source is known, that information can be used in the design process.

As an experiment to illustrate this concept, a three element optical system is designed under the assumption that superresolution processing will increase the sample rate by a factor of m=2. Furthermore, the electro-optic imaging system is designed to be multi-mode. It can be operated either in a conventional single-frame mode, where the imaging subsystem captures one image that is then processed, or in superresolution mode, where the imaging subsystem captures multiple frames that are combined by superresolution processing into a higher resolution image.

Figure 6:
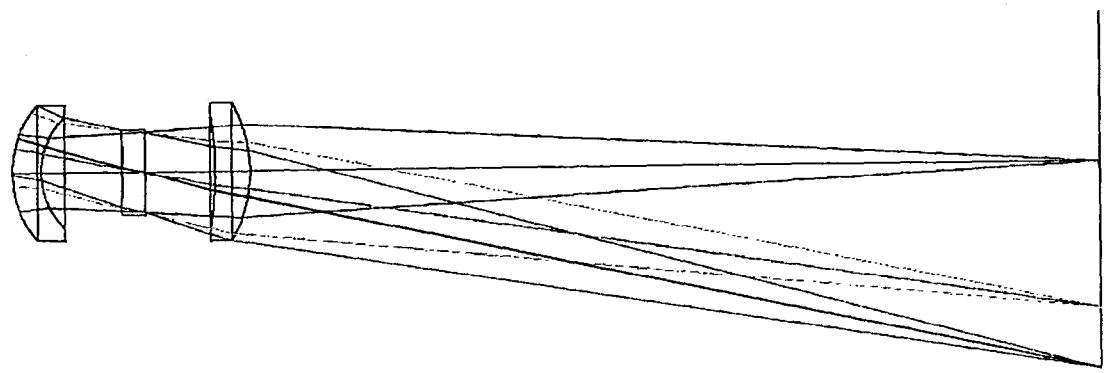
FIG. 6 is a diagram illustrating a triplet designed for multi-mode operation.

FIG. 6 is a diagram of the optical subsystem. The mode is controlled by shifting the center lens along the optical axis. The mechanical motion switches the imaging subsystem between single-frame mode and superresolution mode by varying the spatial frequency cutoff between the standard Nyquist rate (i.e., 1× detector sampling frequency) and the superresolved Nyquist rate (i.e., m× detector sampling frequency). In this experiment, the system is defined by 20 degree 70 mm optics at F/8:0 for 15 micron square pixels with 100 percent fill-factor at 550 nm wavelength.

The lens surface powers and the spacing between elements are design parameters. Four higher order rotationally symmetric aspheric surface sags are also included to allow more control of the pupil function. During the design optimization, the multi-configuration merit function tries to maximize the MTF up to the Nyquist rate for the single-frame mode and up to two times the Nyquist frequency for the superresolution mode. Passing information above these sample rates is also penalized in order to discourage unusable aliasing artifacts.

The resulting lens design is tabulated below in Table 1:

TABLE 1

Optical Prescription

| Surface | Curvature | Thickness | Glass |
|---|---|---|---|
| 1 | 9.63E−02 | 3.55E+00 | BK7 |
| 2 | 1.31E−01 | 8.23E+00 | |
| 3 | 0.00E+00 | 2.00E+00 | BK7 |
| 4 | 0.00E+00 | 6.20E+00 | |
| 5 | −3.63E−02 | 3.55E+00 | BK7 |
| 6 | −7.52E−02 | 9.15E+01 | |

Surface 4 is a rotationally symmetric aspheric surface defined by the following parameters:

Parameter 1: 3.91E-06
Parameter 2: 2.11E-08
Parameter 3: −3.24E-08
Parameter 4: −1.27E-09

Figure 7:
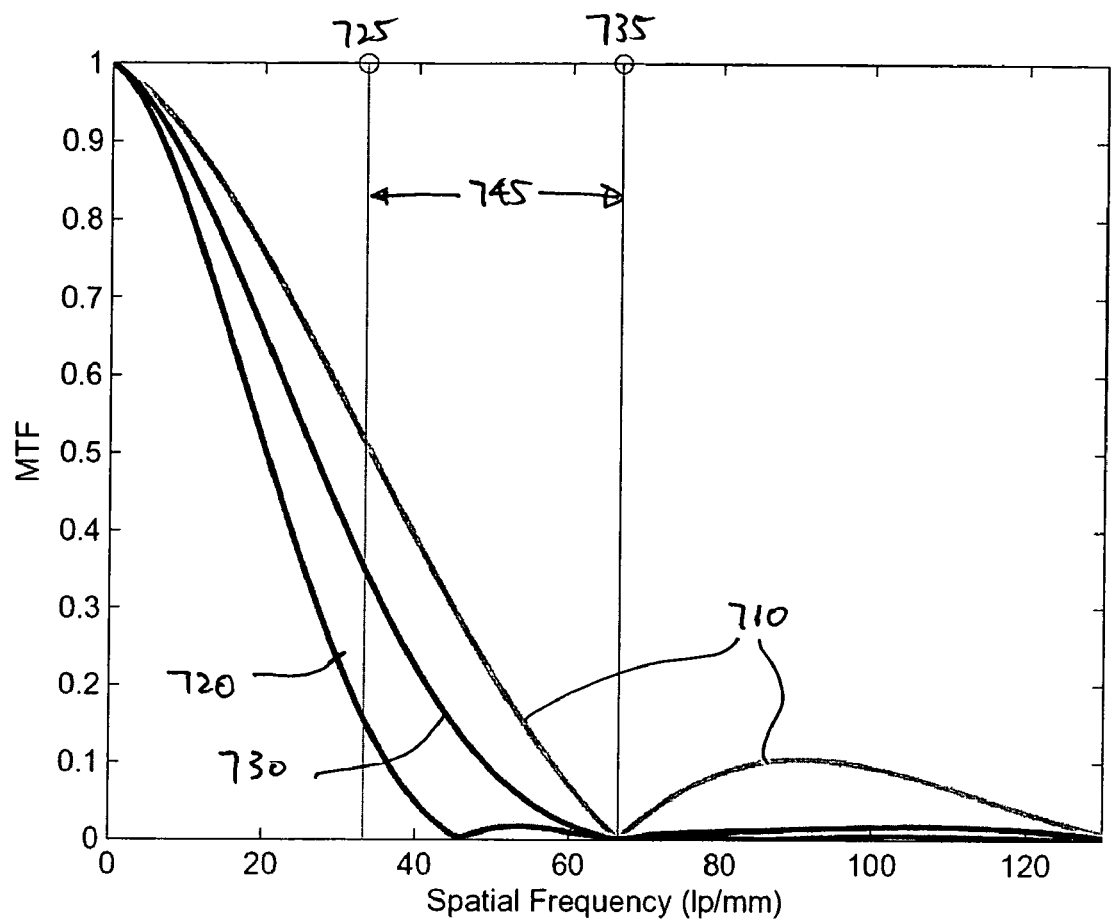
FIG. 7 is a graph showing MTFs for an electro-optic imaging system that can be operated with and without superresolution processing.

FIG. 7 shows the imaging MTF up to the diffraction limit for this system. MTF 710 is the imaging MTF for a diffraction-limited optical subsystem and is shown for comparison. MTF 720 is the MTF in single-frame mode and MTF 730 is the MTF in superresolution mode. Note that both MTFs 720 and 730 significantly reduce information carried in spatial frequencies above 66 lp/mm (which is superresolved sampling frequency 735). Contrast this with the diffraction limited case 710 where much of the image content will appear in higher order lobes as aliasing artifacts. Thus, the optical subsystem is effective at eliminating unwanted aliasing in both modes of operation.

Now consider the superresolution band 745, which is located between the detector sampling frequency 725 of 33 lp/mm and the superresolved sampling frequency 735 of 66 lp/mm. In the single-frame mode 720, most of the spatial frequencies in the superresolution band 745 are blocked. In the superresolution mode 730, more information content is passed. Thus, in single-frame mode 720, the optical subsystem will be effective at removing aliasing artifacts, which are located above the detector sampling frequency 725. In superresolution mode 730, the non-restorable aliasing artifacts (above the superresolved sampling frequency 735 of 66 lp/mm) are removed, whereas the usable aliasing artifacts in the superresolution band 745 are retained.

This example optical subsystem works by changing the optical path difference of the lens system when the center element is shifted along the optical axis. As the element shifts, the wavefront error is increased, effectively increasing the size of the point spread function and hence decreasing the low pass cutoff frequency of the optical MTF. Other approaches could work by increasing or decreasing the aperture size of such an element as well.

The previous example considered the design of the optical subsystem for superresolution processing. Now consider an example concerning the design of the detector subsystem for superresolution processing. Referring again to FIG. 7, note that the zero crossing around 66 lp/mm due to the detector MTF is not correctable even with superresolution processing. In other words, no matter how many lower resolution images are acquired, superresolution processing will only be able to make an educated guess as to the information at these frequencies based on a priori information because the fixed detector geometry always yields a zero at 66 lp/mm.

Figure 8:
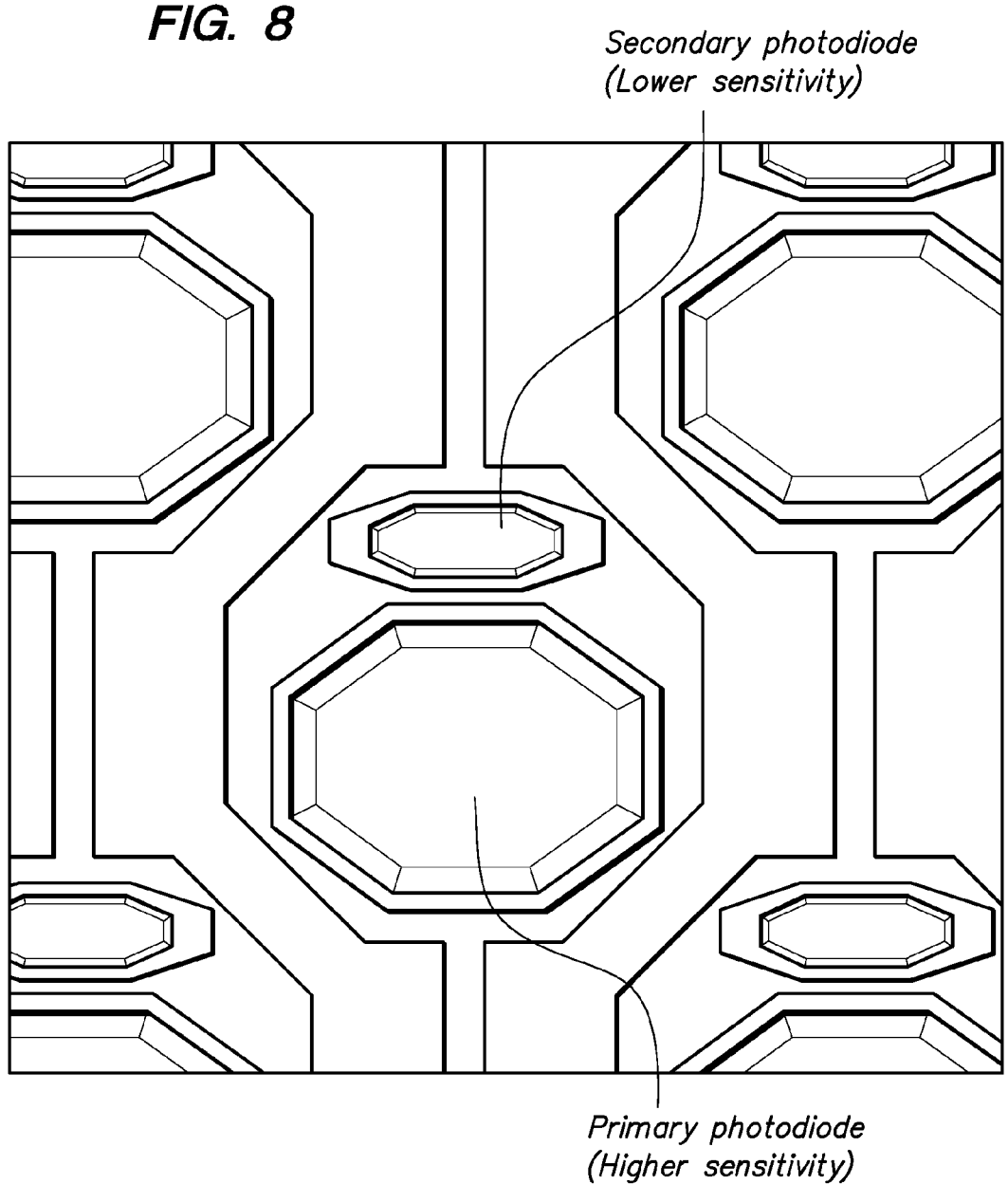
FIG. 8 is a depiction of a variable geometry detector.

However, another approach is to vary the detector geometry during the image acquisition process. For example, FIG. 8 shows a CCD technology by Fuji which has two different photosensitive regions for each pixel. Such a pixel was originally invented to increase the dynamic range of the CCD. However, it can also be used to vary the detector MTF and, therefore, also the imaging MTF. In this way, one lower resolution image might be collected using a first detector MTF with a specific zero crossing, and another lower resolution image might be collected using a second detector MTF with a different zero crossing. By using different imaging MTFs and shifting the zero crossings, a collection of images can be captured that will allow the superresolution algorithm to produce an "effective" MTF without zero crossings. The optical subsystem preferably is designed while considering the variable pixel geometries to maximize information throughput.

To illustrate this concept, consider a similar example as in FIGS. 6-7 but where the design parameters are limited to detector geometry. Assume that the detector is capable of operating in two modes. In the first mode, the sensor pixel geometry is such that the pixel has 100% fill-factor. This mode corresponds to single frame imaging where the highest fill-factor is desired to minimize aliasing and maximize the pixel SNR. Now, assume that the sensor designer can design a pixel which can operate at a secondary pixel geometry by changing the effective fill-factor of the pixel. Reducing the fill-factor, however, comes at the cost of increasing the measurement noise. Assume that the noise scales with $1/f^a$ where f is the fill-factor associated with the secondary mode pixel geometry and a is the constant which captures the noise gain (SNR loss) due to smaller pixel geometries.

Assume that the superresolution digital image processing subsystem is capable of taking two frames and doubling the resolution. For the time being, assume that the sampling offsets are controllable at acquisition time and that the optical subsystem offers performance similar to that shown in FIG. 7 for superresolution mode. Then, there are a pair of images $y_0$ and $y_1$ where the pixel fill-factor is allowed to change for the second image capture $y_1$. For the time being, also assume that the offset for the second image is equal to ½ the pixel pitch. The variance (MSE) or effective noise in the estimated high resolution image is given by $$MSE = Tr\left[\frac{1}{\sigma^2}A(\Phi_0)^T D^T DA(\Phi_0) + \frac{f^a}{\sigma^2}F_1 A(\Phi_1)^T D^T DA(\Phi_1)F_1\right]^{-1} \quad (2)$$

In Eqn. 2, assume that the design parameter $\Phi_i$ represents the fill-factor for the pixels for the ith frame. In this example, the fill-factor for the first frame is 100%. In this way, the imaging MTF approaches zero at the high resolution sampling rate 735 as shown in FIG. 7.

Figure 9:
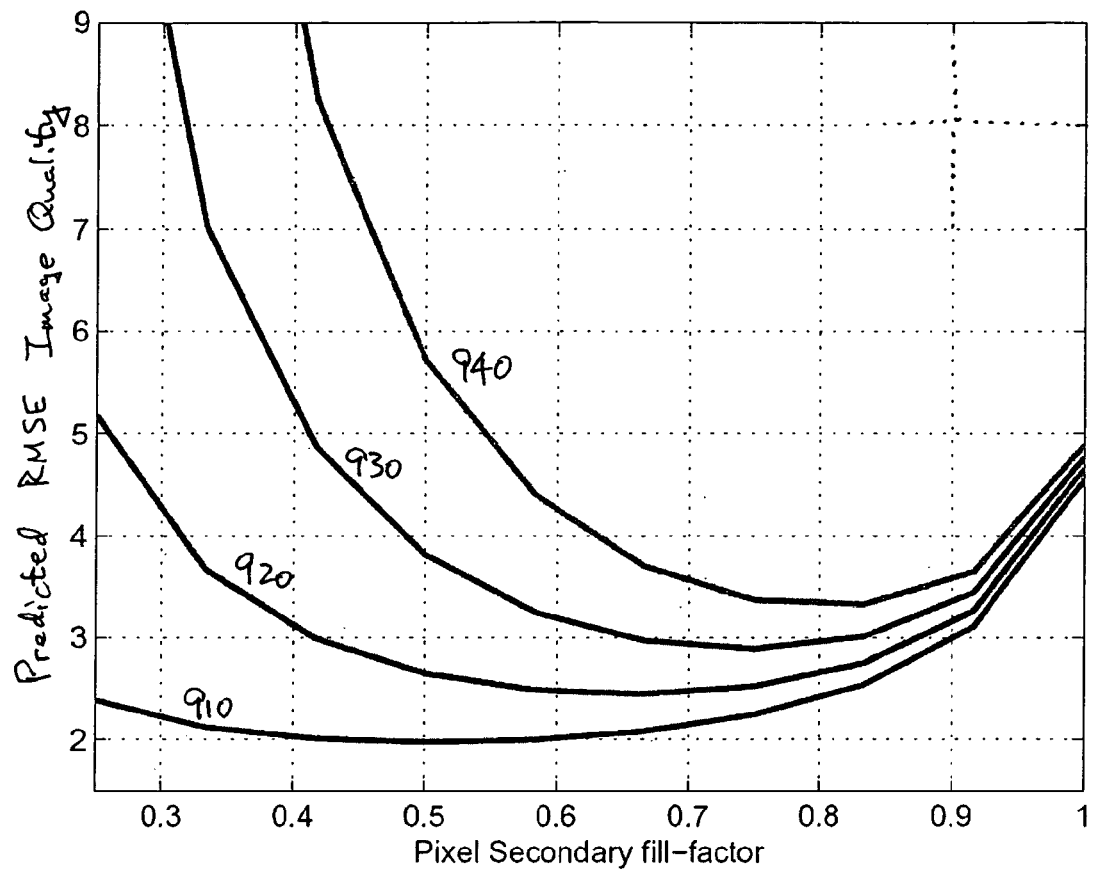
FIG. 9 is a graph of RMSE as a function of fill factor for a variable geometry detector.

Eqn. 2 predicts the MSE as a function of the fill-factor for the second frame. FIG. 9 shows the predicted RMSE as a function of fill-factor for the second image, at different values of the noise gain factor a. Let the noise power of the 100% fill-factor pixel to be $\sigma^2=1$. Shown in FIG. 9 is the square-root of the predicted MSE of Eqn. 2 as a function of the pixel fill-factor for a number of noise gain factors a. Curves 910, 920, 930 and 940 correspond to a=1, 2, 3 and 4, respectively. When the noise penalty for reducing the pixel fill-factor is small (e.g., a=1), the predicted RMSE suggests that a lower fill-factor around 45% is preferred as evidenced by curve 910. As the noise gain factor increases to a=4, however, the optimal fill-factor increases to 80% as shown by curve 940. This shows the design tradeoff between pixel geometry diversity and SNR. When the noise penalty for shrinking the pixel is minimal, having a smaller secondary pixel is better to increase the effective MTF of the post-processed system. When reducing the pixel fill-factor decreases SNR substantially, larger fill-factors are better suited to provide better RMSE. In any real system, the factor a will depend on the manufacturing constraints associated with the sensor design and manufacturing process.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A superresolution electro-optic imaging system comprising:
    an optical subsystem for imaging a source, wherein the optical subsystem is characterized by an optical MTF which, in comparison to an equivalent diffraction-limited optical MTF, contains a higher fraction of energy in a pass band of frequencies below a superresolved sampling frequency;
    a detector subsystem positioned to capture two or more lower resolution images of the source, wherein the detector subsystem is characterized by a detector sampling frequency; and
    a superresolution digital image processing subsystem coupled to the detector subsystem for combining the lower resolution images via superresolution processing into a higher resolution image of the source, wherein the superresolution processing determines a superresolved sampling frequency that is higher than the detector sampling frequency;
    wherein, for each lower resolution image, the optical MTF behaves substantially as a low pass filter with a cutoff frequency at the superresolved sampling frequency.

2. The electro-optic imaging system of claim 1 wherein the superresolved sampling frequency is an integer multiple of the detector sampling frequency.

3. The electro-optic imaging system of claim 1 wherein the lower resolution images include shifted images of a same resolution.

4. The electro-optic imaging system of claim 3 wherein the detector subsystem includes:
    a detector array; and
    an actuator for shifting the detector array relative to the optical subsystem, to produce the shifted images.

5. The electro-optic imaging system of claim 3 wherein the optical subsystem includes:
    imaging optics; and
    an actuator for shifting the imaging optics relative to the detector subsystem, to produce the shifted images.

6. The electro-optic imaging system of claim 3 wherein:
    the optical subsystem and the detector subsystem have fixed positions relative to each other; and
    the optical subsystem includes an optical element for optically shifting an image formed by the optical subsystem relative to the detector subsystem, to produce the shifted images.

7. The electro-optic imaging system of claim 1 wherein the optical subsystem has been designed accounting for the detector subsystem and the superresolution processing.

8. The electro-optic imaging system of claim 1 wherein an effective imaging MTF for the higher resolution image has no zeroes below the superresolved sampling frequency.

9. A superresolution electro-optic imaging system comprising:
    an optical subsystem for imaging a source, wherein the optical subsystem is characterized by an optical MTF which, in comparison to an equivalent diffraction-limited optical MTF, contains a higher fraction of energy in a pass band of frequencies below a superresolved sampling frequency;
    a detector subsystem positioned to capture two or more lower resolution images of the source, wherein the detector subsystem is characterized by a detector sampling frequency; and
    a superresolution digital image processing subsystem coupled to the detector subsystem for combining the lower resolution images via superresolution processing into a higher resolution image of the source, wherein the superresolution processing determines a superresolved sampling frequency that is higher than the detector sampling frequency;
    wherein, for each lower resolution image, the optical subsystem and detector subsystem together are characterized by an imaging MTF that has no zeroes below the superresolved sampling frequency.

10. The electro-optic imaging system of claim 9 wherein the superresolved sampling frequency is an integer multiple of the detector sampling frequency.

11. The electro-optic imaging system of claim 9 wherein the lower resolution images include shifted images of a same resolution.

12. The electro-optic imaging system of claim 11 wherein the detector subsystem includes:
    a detector array; and
    an actuator for shifting the detector array relative to the optical subsystem, to produce the shifted images.

13. The electro-optic imaging system of claim 11 wherein the optical subsystem includes:
  imaging optics; and
  an actuator for shifting the imaging optics relative to the detector subsystem, to produce the shifted images.

14. The electro-optic imaging system of claim 11 wherein:
  the optical subsystem and the detector subsystem have fixed positions relative to each other; and
  the optical subsystem includes an optical element for optically shifting an image formed by the optical subsystem relative to the detector subsystem, to produce the shifted images.

15. The electro-optic imaging system of claim 9 wherein the optical subsystem has been designed accounting for the detector subsystem and the superresolution processing.

16. The electro-optic imaging system of claim 9 wherein an effective imaging MTF for the higher resolution image has no zeroes below the superresolved sampling frequency.

17. A superresolution electro-optic imaging system comprising:
  an optical subsystem for imaging a source, wherein the optical subsystem is characterized by an optical MTF which, in comparison to an equivalent diffraction-limited optical MTF, contains a higher fraction of energy in a pass band of frequencies below a superresolved sampling frequency;
  a detector subsystem positioned to capture two or more lower resolution images of the source, wherein the detector subsystem is characterized by a detector sampling frequency; and
  a superresolution digital image processing subsystem coupled to the detector subsystem for combining the lower resolution images via superresolution processing into a higher resolution image of the source, wherein the superresolution processing determines a superresolved sampling frequency that is higher than the detector sampling frequency;
  wherein, in comparison both to the equivalent diffraction-limited optical MTF and to an equivalent low pass filtered single-frame optical MTF, for each lower resolution image, the optical MTF contains a higher fraction of energy in a superresolution band of frequencies between the detector sampling frequency and the superresolved sampling frequency.

18. The electro-optic imaging system of claim 17 wherein the superresolved sampling frequency is an integer multiple of the detector sampling frequency.

19. The electro-optic imaging system of claim 17 wherein the lower resolution images include shifted images of a same resolution.

20. The electro-optic imaging system of claim 19 wherein the detector subsystem includes:
  a detector array; and
  an actuator for shifting the detector array relative to the optical subsystem, to produce the shifted images.

21. The electro-optic imaging system of claim 19 wherein the optical subsystem includes:
  imaging optics; and
  an actuator for shifting the imaging optics relative to the detector subsystem, to produce the shifted images.

22. The electro-optic imaging system of claim 19 wherein:
  the optical subsystem and the detector subsystem have fixed positions relative to each other; and
  the optical subsystem includes an optical element for optically shifting an image formed by the optical subsystem relative to the detector subsystem, to produce the shifted images.

23. The electro-optic imaging system of claim 17 wherein the optical subsystem has been designed accounting for the detector subsystem and the superresolution processing.

24. The electro-optic imaging system of claim 17 wherein an effective imaging MTF for the higher resolution image has no zeroes below the superresolved sampling frequency.

25. A multiple mode superresolution electro-optic imaging system comprising:
  an imaging subsystem comprising an optical subsystem coupled to a detector subsystem, and a digital image processing subsystem coupled to the imaging subsystem, both the imaging subsystem and digital image processing subsystem capable of operating either in a single-frame mode or in a superresolution mode;
  wherein:
    in a single-frame mode, the imaging subsystem produces an image of a source and the digital image processing subsystem processes the image;
    in a superresolution mode, the imaging subsystem produces two or more lower resolution images of a source and the digital image processing subsystem combines the lower resolution images via superresolution processing into a higher resolution image of the source; and
    the optical subsystem has one or more moveable optical components, and the optical subsystem is switched between single-frame mode and superresolution mode by moving the optical component(s).

26. A multiple mode superresolution electro-optic imaging system comprising:
  an imaging subsystem comprising an optical subsystem coupled to a detector subsystem, and a digital image processing subsystem coupled to the imaging subsystem, both the imaging subsystem and digital image processing subsystem capable of operating either in a single-frame mode or in a superresolution mode;
  wherein:
    in a single-frame mode, the imaging subsystem produces an image of a source and the digital image processing subsystem processes the image;
    in a superresolution mode, the imaging subsystem produces two or more lower resolution images of a source and the digital image processing subsystem combines the lower resolution images via superresolution processing into a higher resolution image of the source; and
    the optical subsystem and detector subsystem together determine an imaging MTF characterized by an imaging cutoff frequency, and the imaging cutoff frequency for each of the lower resolution images captured in the superresolution mode is higher than the imaging cutoff frequency for the single-frame mode.

27. The electro-optic imaging system of claim 26 wherein the optical subsystem and detector subsystem together determine an imaging MTF characterized by an imaging cutoff frequency, and the effective imaging cutoff frequency for the higher resolution image in superresolution mode is an integer multiple of the imaging cutoff frequency for the single-frame mode.

28. A multiple mode superresolution electro-optic imaging system comprising:
  an imaging subsystem comprising an optical subsystem coupled to a detector subsystem, and a digital image processing subsystem coupled to the imaging subsystem, both the imaging subsystem and digital image processing subsystem capable of operating either in a single-frame mode or in a superresolution mode;

wherein:
in a single-frame mode, the imaging subsystem produces an image of a source and the digital image processing subsystem processes the image;
in a superresolution mode, the imaging subsystem produces two or more lower resolution images of a source and the digital image processing subsystem combines the lower resolution images via superresolution processing into a higher resolution image of the source; and
in the superresolution mode, the superresolution processing determines a superresolved sampling frequency that is higher than the detector sampling frequency and, in comparison both to an equivalent diffraction-limited optical MTF and to a low pass filtered single-frame optical MTF, for each lower resolution image, an optical MTF for the optical subsystem contains a higher fraction of energy in a superresolution band of frequencies between the detector sampling frequency and the superresolved sampling frequency.

* * * * *